United States Patent
Whited et al.

(10) Patent No.: US 11,384,226 B2
(45) Date of Patent: Jul. 12, 2022

(54) ETHYLENE-BASED POLYMER COMPOSITIONS WITH IMPROVED PROCESSABILITY

(71) Applicant: Dow Global Technologies LLC, Midland, MI (US)

(72) Inventors: Stephanie M. Whited, South Charleston, WV (US); Troy M. Tambling, Midland, MI (US); Mridula Kapur, Lake Jackson, TX (US); Sarah E. Patterson, Lake Jackson, TX (US); Dane Chang, Sugar Land, TX (US); William J. Michie, Jr., Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 575 days.

(21) Appl. No.: 14/762,484

(22) PCT Filed: Feb. 10, 2014

(86) PCT No.: PCT/US2014/015517
§ 371 (c)(1),
(2) Date: Jul. 22, 2015

(87) PCT Pub. No.: WO2014/126839
PCT Pub. Date: Aug. 21, 2014

(65) Prior Publication Data
US 2015/0353717 A1    Dec. 10, 2015

Related U.S. Application Data

(60) Provisional application No. 61/764,830, filed on Feb. 14, 2013.

(51) Int. Cl.
*C08L 23/08* (2006.01)
*C08L 23/06* (2006.01)
*C08K 5/43* (2006.01)

(52) U.S. Cl.
CPC ............... *C08L 23/06* (2013.01); *C08K 5/43* (2013.01); *C08L 23/0815* (2013.01);
(Continued)

(58) Field of Classification Search
CPC ............ C08K 5/28; C08K 5/005; C08K 5/43; C08K 5/05; C08L 23/02; C08L 2312/00;
(Continued)

(56) References Cited

U.S. PATENT DOCUMENTS 4,814,135 A    3/1989    Heitz
4,857,600 A    8/1989    Gross et al.
(Continued)

FOREIGN PATENT DOCUMENTS

WO    WO2006/065651    *    6/2006
WO    2008/051824 A2        5/2008

OTHER PUBLICATIONS

PCT/US2014/015517, International Search Report and Written Opinion dated Apr. 4, 2014.
PCT/US2014/015517, International Preliminary Report on Patentability dated Aug. 27, 2015.

*Primary Examiner* — Lee E Sanderson

(57) ABSTRACT

The invention provides a composition comprising the following components: A) a first composition, wherein the first composition comprises a first ethylene-based polymer and a second ethylene-based polymer, and wherein the ratio of the "high load melt index (I21) of the first composition" to the "high load melt index (I21) of the first ethylene-based polymer" is greater than, or equal to, 40, and B) one or more
(Continued)

azide compounds present in an amount greater than, or equal to, 50 ppm, based on the weight of the first composition.

11 Claims, 1 Drawing Sheet

(52) U.S. Cl.
CPC ..... *C08L 2203/18* (2013.01); *C08L 2205/025* (2013.01); *C08L 2205/05* (2013.01); *C08L 2205/06* (2013.01); *C08L 2207/066* (2013.01); *C08L 2308/00* (2013.01); *C08L 2312/00* (2013.01); *C08L 2314/02* (2013.01); *Y10T 428/139* (2015.01); *Y10T 428/1397* (2015.01)

(58) Field of Classification Search
CPC ............. C08L 23/0815; C08L 2203/18; C08L 2205/025; C08L 2205/05; C08L 2205/06; C08L 2207/066; C08L 2314/02; Y10T 428/139; Y10T 428/135; Y10T 428/1369; Y10T 428/1393; Y10T 428/1397
USPC ........... 524/159; 428/35.7, 34.1, 36.9, 36.91, 428/36.92

See application file for complete search history.

(56) References Cited

U.S. PATENT DOCUMENTS

| | | |
|---|---|---|
| 5,076,988 A | 12/1991 | Rifi |
| 5,153,382 A | 10/1992 | Gross et al. |
| 6,776,924 B2 | 8/2004 | Walters et al. |
| 8,129,472 B2 | 3/2012 | Turner et al. |
| 8,344,068 B2 | 1/2013 | Michie, Jr. et al. |
| 8,920,891 B2 | 12/2014 | Michie, Jr. et al. |
| 9,056,970 B2 | 6/2015 | Davis et al. |
| 9,156,972 B2 | 10/2015 | Duguid et al. |
| 9,175,111 B2 | 11/2015 | Kapur et al. |
| 2010/0056727 A1 | 3/2010 | LiPiShan et al. |
| 2011/0136983 A1 | 6/2011 | Kapur et al. |
| 2012/0100357 A1 | 4/2012 | Michie, Jr. et al. |
| 2012/0302681 A1* | 11/2012 | Neubauer ................ C08K 5/28 524/159 |
| 2014/0148535 A1 | 5/2014 | Kapur et al. |

\* cited by examiner

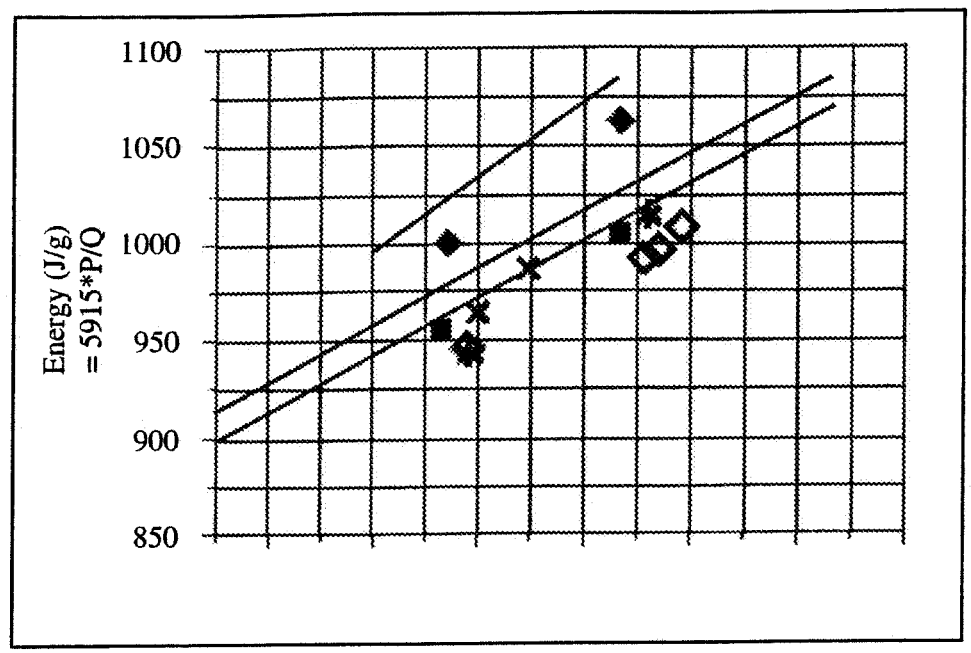

ETHYLENE-BASED POLYMER COMPOSITIONS WITH IMPROVED PROCESSABILITY

REFERENCE TO RELATED APPLICATIONS

This application claims the benefit of U.S. Provisional Application No. 61/764,830, filed on Feb. 14, 2013.

BACKGROUND

The present invention provides ethylene-based polymer compositions, and articles prepared from the same. The compositions of the invention have improved processability, and are particularly suitable for use in the extrusion of high pressure pipes.

Conventional resins for pipe produced with Ziegler-Natta catalysts typically have excellent mechanical properties, but are difficult to process. Many of these resins have low melt strength, and thus, low resistance to sag, which add to the difficulty in extruding pipe from these resins. The melt strength and sag resistance can be improved by post reactor modification of the resin, such as azide coupling (see, for example, WO2006/065651, WO2010/088265 and WO2011/062961). However, it has been discovered that azide-coupled resins can be difficult to process under extreme shear conditions. Under high shear conditions, pipe formed from such resins have very rough internal and external surfaces. As a result, such resins must be processed at lower shear rates, resulting in lower production rates. In some cases, external surface roughness can be eliminated by the use of a process aid. In other cases, even with a process aid, surface roughness cannot be eliminated. Another approach to eliminate surface roughness is to decrease the amount of azide used to couple the resin. However, the reduction in azide content has not proven to be a universal solution for all pipe resins and all pipe fabrication conditions.

Thus, there is a need for new pipe resins that can be processed at high shear rates, and which result in pipes with good surface appearance and good pipe properties. These needs have been met by the following invention.

SUMMARY OF THE INVENTION

The invention provides a composition comprising the following components:

A) a first composition, wherein the first composition comprises a first ethylene-based polymer and a second ethylene-based polymer, and wherein the ratio of the "high load melt index (I21) of the first composition" to the "high load melt index (I21) of the first ethylene-based polymer" is greater than, or equal to, 40, and B) one or more azide compounds present in an amount greater than, or equal to, 50 ppm, based on the weight of the first composition.

BRIEF DESCRIPTION OF THE DRAWINGS

FIG. 1 depicts the Specific Energy versus Output Rate for inventive and comparative resins. Lines have been drawn through measured data points to indicate trends.

DETAILED DESCRIPTION

As discussed above, the invention provides a composition comprising the following components:

A) a first composition, wherein the first composition comprises a first ethylene-based polymer and a second ethylene-based polymer, and wherein the ratio of the "high load melt index (I21) of the first composition" to the "high load melt index (I21) of the first ethylene-based polymer" is greater than, or equal to, 40, and B) one or more azide compounds present in an amount greater than, or equal to, 50 ppm ($\mu$g/g), based on the weight of the first composition.

An inventive composition may comprise a combination of two or more embodiments as described herein.

The first composition may comprise a combination of two or more embodiments as described herein.

The first ethylene-based polymer may comprise a combination of two or more embodiments as described herein.

The second ethylene-based polymer may comprise a combination of two or more embodiments as described herein.

In one embodiment, the first composition comprises a first ethylene-based polymer and a second ethylene-based polymer, and wherein the ratio of the "high load melt index (I21) of the first composition" to the "high load melt index (I21) of the first ethylene-based polymer" is greater than, or equal to, 45, further greater than, or equal to, 50, further greater than, or equal to, 55.

In one embodiment, the first composition comprises a first ethylene-based polymer and a second ethylene-based polymer, and wherein the ratio of the "high load melt index (I21) of the first composition" to the "high load melt index (I21) of the first ethylene-based polymer" is greater than, or equal to, 58, further greater than, or equal to, 60, further greater than, or equal to, 62.

In one embodiment, the ratio of the "high load melt index (I21) of the first composition" to the "high load melt index (I21) of the first ethylene-based polymer" is from 40 to 120, further from 50 to 100, further from 60 to 90.

In one embodiment, component B is present in an amount greater than, or equal to, 55 ppm ($\mu$g/g), further greater than, or equal to, 60 ppm ($\mu$g/g), based on the weight of the first composition.

In one embodiment, the component B is present in an amount from 50 to 100 ppm ($\mu$g/g), further from 55 to 95 ppm ($\mu$g/g), further from 60 to 90 ppm ($\mu$g/g), based on the weight of the first composition.

In one embodiment, the first ethylene-based polymer has a high load melt index (I21) less than, or equal to, 0.35 g/10 min, further less than, or equal to, 0.30 g/10 min, further less than, or equal to, 0.25 g/10 min, further less than, or equal to, 0.22 g/10 min.

In one embodiment, the I21 of the first ethylene-based polymer is less than the I21 of the second ethylene-based polymer.

In one embodiment, the Mw (first ethylene-based polymer) is greater than the Mw (second ethylene-based polymer). Mw refers to the weight average molecular weight, as determined by GPC.

In one embodiment, the Mw (first ethylene-based polymer) is at least twice the Mw (second ethylene-based polymer).

In one embodiment, the weight ratio of the first ethylene-based polymer to the second ethylene-based polymer is less than, or equal to, 1.5, further less than, or equal to, 1.3, further less than, or equal to, 1.2, further less than, or equal to, 1.1, further less than, or equal to, 1.0, and further less than, or equal to, 0.9.

In one embodiment, the first composition has a density greater than 0.940 g/cm³, further greater than 0.945 g/cm³, further greater than 0.947 g/cm³ (1 cm³=1 cc).

In one embodiment, the first composition has a density less than, or equal to, 0.960 g/cm³, further less than, or equal to, 0.955 g/cm³, further less than, or equal to, 0.955 g/cm³.

In one embodiment, the first composition has a melt flow ratio (I21/I5) from 25 to 45, further from 30 to 40.

In one embodiment, the first composition has a high load melt index (I21) from 8 to 25 g/10 min, further from 10 to 22 g/10 min, further from 12 to 20 g/10 min.

In one embodiment, the composition comprises greater than, or equal to, 80 weight percent, further greater than, or equal to, 85 weight percent, further greater than, or equal to, 88 weight percent, of the first composition, based on the weight of the composition.

In one embodiment, the composition comprises greater than, or equal to, 90 weight percent, further greater than, or equal to, 95 weight percent, further greater than, or equal to, 98 weight percent, of the first composition, based on the weight of the composition.

In one embodiment, the first ethylene-based polymer has a density greater than, or equal to, 0.915 g/cm³, further greater than, or equal to, 0.920 g/cm³.

In one embodiment, the first ethylene-based polymer is an ethylene/α-olefin interpolymer, and further an ethylene/α-olefin copolymer. In a further embodiment, the α-olefin is selected from the group consisting of C3 to C20 α-olefins, further C3 to C10 α-olefins. In yet a further embodiment, the α-olefin is selected from the group consisting of propylene, 1-butene, 1-pentene, 1-hexene, 1-heptene, 1-octene, 4-methyl-1-pentene, 1-nonene and 1-decene, and is further selected from the group consisting of propylene, 1-butene, 1-hexene and 1-octene, and further the α-olefin is 1-butene or 1-hexene, and further 1-hexene.

The second ethylene-based polymer is an ethylene homopolymer or an ethylene-based interpolymer. In one embodiment the second ethylene-based polymer is an ethylene homopolymer.

In one embodiment, the second ethylene-based polymer is an ethylene-based interpolymer. In a further embodiment, the second ethylene-based polymer is an ethylene-based copolymer. In a further embodiment, the α-olefin is selected from the group consisting of C3 to C20 α-olefins, further C3 to C10 α-olefins. In yet a further embodiment, the α-olefin is selected from the group consisting of propylene, 1-butene, 1-pentene, 1-hexene, 1-heptene, 1-octene, 4-methyl-1-pentene, 1-nonene and 1-decene, and is further selected from the group consisting of propylene, 1-butene, 1-hexene and 1-octene, and further the α-olefin is 1-butene or 1-hexene, and further 1-hexene.

In one embodiment, the second ethylene-based polymer is an ethylene homopolymer.

In one embodiment, the first ethylene-based polymer is a heterogeneously branched ethylene-based interpolymer, and further a copolymer. Heterogeneously branched interpolymers, as known in the art, are typically produced by Ziegler-Natta type catalysts, and contain a non-homogeneous distribution of comonomer among the molecules of the interpolymer. In a further embodiment, the comonomer is an α-olefin, and further an α-olefin is selected from the group consisting of C3 to C20 α-olefins, further C3 to C10 α-olefins. In yet a further embodiment, the α-olefin is selected from the group consisting of propylene, 1-butene, 1-pentene, 1-hexene, 1-heptene, 1-octene, 4-methyl-1-pentene, 1-nonene and 1-decene, and is further selected from the group consisting of propylene, 1-butene, 1-hexene and 1-octene, and further the α-olefin is 1-butene or 1-hexene, and further 1-hexene.

In one embodiment, the second ethylene-based polymer is a heterogeneously branched ethylene-based interpolymer, and further a copolymer. In a further embodiment, the comonomer is an α-olefin, and further an α-olefin is selected from the group consisting of C3 to C20 α-olefins, further C3 to C10 α-olefins. In yet a further embodiment, the α-olefin is selected from the group consisting of propylene, 1-butene, 1-pentene, 1-hexene, 1-heptene, 1-octene, 4-methyl-1-pentene, 1-nonene and 1-decene, and is further selected from the group consisting of propylene, 1-butene, 1-hexene and 1-octene, and further the α-olefin is 1-butene or 1-hexene, and further 1-hexene.

In one embodiment, the first ethylene-based polymer is present in an amount from 38 to 60 weight percent, further from 40 to 58 weight percent, further from 42 to 57, and further from 45 to 55 weight percent, based on the sum weight of the first ethylene-based polymer and the second ethylene-based polymer.

In one embodiment, the first ethylene-based polymer is present in an amount from 38 to 56 weight percent, further from 40 to 56 weight percent, and further from 42 to 56 weight percent, based on the sum weight of the first ethylene-based polymer and the second ethylene-based polymer.

In one embodiment, the first ethylene-based polymer is present in an amount from 38 to 52 weight percent, further from 40 to 51 weight percent, and further from 42 to 51 weight percent, based on the sum weight of the first ethylene-based polymer and the second ethylene-based polymer.

In one embodiment, the second ethylene-based polymer is present in an amount from 40 to 62 weight percent, further from 42 to 60 weight percent, further from 43 to 58, and further from 45 to 55 weight percent, based on the sum weight of the first ethylene-based polymer and the second ethylene-based polymer.

In one embodiment, the second ethylene-based polymer is present in an amount from 44 to 62 weight percent, further from 44 to 60 weight percent, and further from 44 to 58 weight percent, based on the sum weight of the first ethylene-based polymer and the second ethylene-based polymer.

In one embodiment, the second ethylene-based polymer is present in an amount from 48 to 62 weight percent, further from 49 to 60 weight percent, and further from 49 to 58 weight percent, based on the sum weight of the first ethylene-based polymer and the second ethylene-based polymer.

In one embodiment, the first composition comprises greater than, or equal to, 90 weight percent, further greater than, or equal to, 95 weight percent, and further greater than, or equal to, 98 weight percent, of the first ethylene-based polymer and the second ethylene-based polymer, based on the weight of the first composition.

In one embodiment, the composition comprises greater than, or equal to, 90 weight percent, further greater than, or equal to, 95 weight percent, and further greater than, or equal to, 98 weight percent, of the first ethylene-based polymer and the second ethylene-based polymer, based on the weight of the composition.

The invention provides a rheology modified resin formed from the composition of any one embodiment or two or more embodiments described herein. A rheology modified resin is formed by reacting component A with component B. See summary of invention.

In one embodiment, the rheology modified resin has a viscosity ($\eta^*$ at 0.02 s$^{-1}$, 190° C.) from 180,000 to 240,000 Pa·s, further from 190,000 to 230,000 Pa·s.

In one embodiment, the rheology modified resin has a tan delta (0.02 s$^{-1}$, 190° C.) from 1.40 to 1.90, further from 1.50 to 1.80.

In one embodiment, the rheology modified resin has a viscosity ratio ($\eta^*$ at 0.2 s$^{-1}$, 190° C.) to ($\eta^*$ at 100 s$^{-1}$, 190° C.) from 60 to 90, further from 65 to 85.

The invention also provides a second composition comprising the rheology modified resin of any one embodiment or two or more embodiments described herein.

The invention also provides an article comprising at least one component formed from the composition of any embodiment or two or more embodiments described herein. In one embodiment, the article is selected from the following: a pipe, a molded container, a sheet, a geomembrane, a coating, a pipe fitting, or an injection molding fitting. In a further embodiment, the article is a pipe.

An article may comprise a combination of two or more embodiments as described herein.

The second composition may comprise a combination of two or more embodiments as described herein.

The rheology modified resin may comprise a combination of two or more embodiments as described herein.

The composition may comprise a combination of two or more embodiments as described herein.

The first composition may comprise a combination of two or more embodiments as described herein.

The first ethylene-based polymer may comprise a combination of two or more embodiments as described herein.

The second ethylene-based polymer may comprise a combination of two or more embodiments as described herein.

Composition

In one embodiment, the composition comprises greater than, or equal to, 90 weight percent, further greater than, or equal to, 95 weight percent, and more further greater than, or equal to, 98 weight percent of the sum weight of the first ethylene-based polymer and second ethylene-based polymer, based on the weight of the composition.

In one embodiment, the composition comprises less than 5 weight percent, further less than 2.5 weight percent, based on the weight of the composition, of another polymer, other than the first ethylene-based polymer and second ethylene-based polymer.

In one embodiment, the composition has a viscosity ($\eta^*$ at 0.02 s$^{-1}$, 190° C.) greater than 140,000 Pa·s, further greater than 160,000 Pa·s, further greater than 180,000 Pa·s, and further greater than 190,000 Pa·s.

In one embodiment, the composition has a tan delta (at 0.02 s$^{-1}$, 190° C.) less than 1.90, further less than, or equal to, 1.80, and further less than, or equal to, 1.70.

In one embodiment, the composition has a tan delta (at 0.02 s$^{-1}$, 190° C.) greater than, or equal to, 1.40, and further greater than, or equal to, 1.45, further greater than, or equal to, 1.50.

The composition may comprise a combination of two or more embodiments as described herein.

First Composition

In one embodiment, the first composition comprises greater than, or equal to, 90 weight percent, further greater than, or equal to, 95 weight percent, and more further greater than, or equal to, 98 weight percent, of the sum weight of the first ethylene-based polymer and second ethylene-based polymer, based on the weight of the first composition.

In one embodiment, the first composition comprises less than 5 weight percent, further less than 2.5 weight percent, based on the weight of the first composition, of another polymer, other than the first ethylene-based polymer and second ethylene-based polymer.

First Ethylene-Based Polymer

In one embodiment, the first ethylene-based polymer has a density less than, or equal to, 0.940 g/cm$^3$, further less than, or equal to, 0.935 g/cm$^3$, further less than, or equal to, 0.930 g/cm$^3$, and further less than, or equal to, 0.925 g/cm$^3$. In a further embodiment, the first ethylene-based polymer is an ethylene-based interpolymer, and further an ethylene-based copolymer.

In one embodiment, the first ethylene-based polymer has a density greater than, or equal to, 0.910 g/cm$^3$, further greater than, or equal to, 0.915 g/cm$^3$, further greater than, or equal to, 0.918 g/cm$^3$, and further greater than, or equal to, 0.920 g/cm$^3$. In a further embodiment, the first ethylene-based polymer is an ethylene-based interpolymer, and further an ethylene-based copolymer.

In one embodiment, the first ethylene-based polymer has a high load melt index (I21) less than, or equal to, 1.00 g/10 min, further less than, or equal to, 0.50 g/10 min, further less than, or equal to, 0.40 g/10 min, and further less than, or equal to, 0.30 g/10 min. In a further embodiment, the first ethylene-based polymer is an ethylene-based interpolymer, and further an ethylene-based copolymer.

In one embodiment, the first ethylene-based polymer has a high load melt index (I21) greater than, or equal to, 0.05 g/10 min, further greater than, or equal to, 0.10 g/10 min, further greater than, or equal to, 0.15 g/10 min. In a further embodiment, the first ethylene-based polymer is an ethylene-based interpolymer, and further an ethylene-based copolymer.

In one embodiment, the first ethylene-based polymer has a higher molecular weight than the second ethylene-based polymer, as determined by the polymerization conditions of each component, melt index, GPC methods (molecular weights), and/or other methods known in the art.

In one embodiment, the first ethylene-based polymer is an ethylene/α-olefin interpolymer, and further an ethylene/α-olefin copolymer. In a preferred embodiment, the α-olefin is a C3-C20 α-olefin, further a C3-C10 α-olefin, further a C4-C10 α-olefin, further a C4-C8 α-olefin, and further C6-C8 α-olefin. Preferred α-olefins include 1-butene, 1-hexene and 1-octene, and further 1-hexene.

In one embodiment, the first ethylene-based interpolymer is an ethylene/1-hexene interpolymer, and further an ethylene/1-hexene copolymer.

The first ethylene-based polymer may comprise a combination of two or more embodiments as described herein.

Second Ethylene-Based Polymer

The second ethylene-based polymer differs from the first ethylene-based polymer in one or more properties, such as density, melt index (for example, I2 and/or I21), molecular weight (for example Mn and/or Mw) and/or molecular weight distribution (MWD).

In one embodiment, the second ethylene-based polymer has a density greater than, or equal to, 0.955 g/cm$^3$, further greater than, or equal to, 0.960 g/cm$^3$, and further greater than, or equal to, 0.965 g/cm$^3$. In a further embodiment, the second ethylene-based polymer is an ethylene-based interpolymer, and further an ethylene-based copolymer. In another embodiment, the second ethylene-based polymer is an ethylene homopolymer.

In one embodiment, the second ethylene-based polymer has a density less than, or equal to, 0.975 g/cm$^3$, further less than, or equal to, 0.972 g/cm$^3$, further less than, or equal to, 0.970 g/cm$^3$. In a further embodiment, the second ethylene-based polymer is an ethylene-based interpolymer, and further an ethylene-based copolymer. In another embodiment, the second ethylene-based polymer is an ethylene homopolymer.

In one embodiment, the second ethylene-based polymer has a density from 0.955 to 0.975 g/cm$^3$, further from 0.960 to 0.972 g/cm$^3$, further from 0.965 to 0.970 g/cm$^3$. In a further embodiment, the second ethylene-based polymer is an ethylene-based interpolymer, and further an ethylene-based copolymer. In another embodiment, the second ethylene-based polymer is an ethylene homopolymer.

In one embodiment, the second ethylene-based polymer is an ethylene/α-olefin interpolymer, and further an ethylene/α-olefin copolymer. In a further embodiment, the α-olefin is a C3-C20 α-olefin, further a C3-C10 α-olefin, further a C4-C8 α-olefin, and further a C6-C8 α-olefin. Especially preferred α-olefins include 1-butene, 1-hexene and 1-octene, and further 1-hexene.

In one embodiment, the second ethylene-based polymer is an ethylene/1-hexene copolymer.

In another embodiment, the second ethylene-based polymer is an ethylene homopolymer.

The second ethylene-based polymer may comprise a combination of two or more embodiments as described herein.

Azide Compounds

An azide compound contains at least one N$_3$ moiety, and preferably at least two, N$_3$ moieties. Azide compounds include polyfunctional sulfonyl azides, as disclosed in U.S. Pat. No. 6,521,306, incorporated herein by reference. Preferred polyfunctional sulfonyl azides have at least two sulfonyl azide groups (—SO$_2$N$_3$). In one embodiment, the polyfunctional sulfonyl azide has a structure X—R—X, wherein each X is SO$_2$N$_3$, and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently, to permit a *facile* reaction between the polyolefin and the polyfunctional sulfonyl azide.

Polyfunctional sulfonyl azide materials include such compounds as 1,5-pentane bis(sulfonyl azide); 1,8-octane bis(sulfonyl azide); 1,10-decane bis(sulfonyl azide); 1,10-octadecane bis(sulfonyl azide); 1-octyl-2,4,6-benzene tris(sulfonyl azide); 4,4'-diphenyl ether bis(sulfonyl azide); 1,6-bis(4'-sulfonazidophenyl) hexane; 2,7-naphthalene bis(sulfonyl azide); and mixed sulfonyl azides of chlorinated aliphatic hydrocarbons containing an average of from 1 to 8 chlorine atoms and from 2 to 5 sulfonyl azide groups per molecule; and mixtures thereof. Preferred polyfunctional sulfonyl azide materials include oxy-bis(4-sulfonylazidobenzene); 2,7-naphthalene bis(sulfonyl azido); 4,4'-bis(sulfonyl azido)biphenyl; 4,4'-diphenyl ether bis(sulfonyl azide) (also known as diphenyloxide-4,4'-disulfonylazide; and bis(4-sulfonyl azidophenyl)methane; and mixtures thereof. Most preferred is diphenyloxide-4,4'-disulfonylazide (designated DPO-BSA herein).

Sulfonyl azides are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used. Polyfunctional sulfonyl azides are also described in U.S. Pat. No. 6,776,924, fully incorporated herein by reference.

For rheology modification, the polyfunctional sulfonyl azide is admixed with the polymer, and heated to at least the decomposition temperature of the polyfunctional sulfonyl azide. By decomposition temperature of the polyfunctional sulfonyl azide, it is meant that temperature at which the polyfunctional sulfonyl azide converts to the sulfonyl nitrene, eliminating nitrogen and heat in the process, as determined by DSC. In one embodiment, the polyfunctional sulfonyl azide begins to react at a kinetically significant rate (convenient for use in the practice of the invention) at temperatures of about 130° C., and is almost completely reacted at about 160° C. in a DSC (scanning at 10° C./min). Onset of decomposition was found to be about 100° C. by Accelerated Rate calorimetry (ARC) scanning at 2° C./hr. Extent of reaction is a function of time and temperature. Temperatures for use in the practice of the invention are also determined by the softening or melt temperatures of the polymer starting materials. For these reasons, the temperature is advantageously greater than 90° C., preferably greater than 120° C., more preferably greater than 150° C., most preferably greater than 180° C. Preferred reaction times at the desired decomposition temperatures, are times that are sufficient to result in reaction of the azide compound with the polymer(s), without undesirable thermal degradation of the polymer matrix.

Admixing of the polymer and azide compound is accomplished by any means known in the art. Desired distribution is different in many cases, depending on what rheological properties are to be modified. It is desirable to have as homogeneous a distribution as possible, preferably achieving solubility of the azide in the polymer melt.

The term "melt processing" is used to mean any process in which the polymer is softened or melted, such as extrusion, pelletizing, film blowing and casting, thermoforming, compounding in polymer melt form, and other melt processes.

The polymer and azide compound are suitably combined in any manner which results in desired reaction thereof, preferably by mixing the azide compound with the polymer(s) under conditions which allow sufficient mixing before reaction, to avoid uneven amounts of localized reaction, then subjecting the resulting admixture to heat sufficiently for reaction.

Any equipment is suitably used; preferably equipment which provides sufficient mixing and temperature control in the same equipment. Preferably, a continuous polymer processing system, such as an extruder, or a semi-continuous polymer processing system, such as a BANBURY mixer, is used. For the purposes of this invention, the term extruder is used, for its broadest meaning, to include such devices as a device which extrudes pellets, as well as devices in which the polymeric material is extruded in the form of sheets or other desired shapes and/or profiles.

Extruders and processes for extrusion are described in U.S. Pat. Nos. 4,814,135; 4,857,600; 5,076,988; and 5,153,382 (each incorporated herein by reference). Examples of various extruders, which can be used in forming pellets are single screw and multi-screw types. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase, to avoid later steps for removal of the solvent or other medium. For this purpose, a polymer above the crystalline melt temperature is advantageous for uniform mixing, and for reaching a reaction temperature (the decomposition temperature of the azide compound).

In a preferred embodiment, the azide modified polymers are substantially gel free. In order to detect the presence of, and where desirable, quantify, insoluble gels in a polymer composition, the composition is soaked in a suitable solvent, such as refluxing xylene, for 12 hours, as described in ASTM D 2765-90, Method B. Any insoluble portion of the composition is then isolated, dried and weighed, making suitable corrections based upon knowledge of the composition. For example, the weight of "non-polymeric, solvent-soluble components" is subtracted from the initial weight; and the weight of "non-polymeric, solvent-insoluble, components" is subtracted from both the initial and final weight. The insoluble polymer recovered is reported as "percent gel" content (based on the weight of the composition). For purposes of this invention, "substantially gel free" means a percent gel content that is less than 10 percent, preferably less than 8 percent, more preferably less than 5 percent, even more preferably less than 3 percent, still more preferably less than 2 percent, even more preferably less than 0.5 percent, and most preferably below detectable limits, when using xylene as the solvent.

Preferably the inventive compositions do not contain peroxides and/or other types of coupling agents. Examples of other types of coupling agents include phenols; aldehyde-amine reaction products; substituted ureas; substituted guanidines; substituted xanthates; substituted dithiocarbamates; sulfur-containing compounds, such as thiazoles, imidazoles, sulfenamides, thiuramidisulfides, elemental sulfur, paraquinonedioxime, dibenzopara-quinonedioxime; or combinations thereof.

Additives

The inventive compositions may contain one or more additives. Additives include, but are not limited to, processing aids, acid neutralizers, UV stabilizers, hydro peroxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, and combinations thereof.

Fabricated Articles

The compositions of the present invention can be used to manufacture a shaped article, or one or more components of a shaped article. Such articles may be single-layer or multi-layer articles, which are typically obtained by suitable known conversion techniques. The compositions according to the present invention are particularly suitable for fabrication of pipe.

Definitions

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer and the term interpolymer as defined hereinafter. Trace amounts of impurities, such as catalyst residues, may be incorporated into and/or within the polymer.

The term "interpolymer," as used herein, refers to polymers prepared by the polymerization of at least two different types of monomers. The generic term interpolymer thus includes copolymers and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, a majority amount of ethylene monomer (based on the weight of the interpolymer), and at least one comonomer.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "ethylene homopolymer," and like terms, as used herein, refer to a polymer polymerized in a reactor in the presence of ethylene, and in which no fresh comonomer is fed into the reactor. Fresh comonomer, as known in the art, refers to a feed source of comonomer located outside a reactor or located outside one or more reactors operated in series or parallel, and which comonomer is fed into a reactor from this outside feed source. Very low levels of comonomer, typically carried over from a prior reactor, maybe present in the reactor in which the homopolymer is polymerized. Typical "comonomer to ethylene" molar ratio is less than 0.01 (as determined by the minimum level of comonomer detected by an on-line gas chromatography instrument) in the reactor at issue.

The terms "blend" or "polymer blend," as used herein, refer to a blend of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to materiality or operability. The term "consisting of" excludes any component, step or procedure not specifically delineated or listed.

Test Methods

Density

Resin density was measured by the Archimedes displacement method, ASTM D792, Method B, in isopropanol. Specimens were measured within one hour of molding, after conditioning in the isopropanol bath, at 23° C., for eight minutes, to achieve thermal equilibrium prior to measurement. The specimens were compression molded according to ASTM D4703, Annex A-1, per Procedure C.

Melt Flow Rate by Extrusion Plastomer

Melt flow rate measurements were performed according to ASTM D1238, Condition 190° C./2.16 kg, Condition 190° C./5 kg and Condition 190° C./21.6 kg, which are known as I2, I5 and I21 (high load melt index), respectively (ethylene-based polymers). Melt flow rate is inversely proportional to the molecular weight of the polymer. Thus, the higher the molecular weight, the lower the melt flow rate, although the relationship is not linear.

Differential Scanning Calorimetry (DSC)

The peak melting temperature ($T_m$), heat of fusion ($\Delta$Hm), peak crystallization temperature (Tc), and heat of crystallization ($\Delta$Hc), were generated via a TA Instruments Model Q1000 DSC, equipped with an RCS (refrigerated cooling system) cooling accessory and an auto sampler. A nitrogen purge gas flow of 50 ml/min was used throughout. The sample was pressed into a thin film, using a press at 175° C. and 1500 psi (10.3 MPa) maximum pressure for about 15 seconds, then air-cooled to room temperature at atmospheric pressure. A "6 mm diameter" disk (about 3 to 10 mg) was cut from the film using a paper hole punch, weighed to the nearest 0.001 mg, placed in a light aluminum pan (ca 50 mg) and then crimped shut.

The thermal behavior of the sample was investigated with the following temperature profile. The sample was rapidly heated to 180° C., and held isothermal for three minutes, in order to remove any previous thermal history. The sample was then cooled to -40° C., at 10° C./min cooling rate, and was held at -40° C. for three minutes. The sample was then heated to 150° C. at 10° C./min heating rate. The cooling and second heating curves were recorded. The Tc and $\Delta$Hc were determined from the cooling curve, and the Tm and $\Delta$Hm were determined from the second heating curve.

Molecular Weight (MW) and Molecular Weight Distribution (MWD) by GPC Conventional Data from Triple Detector GPC A high temperature Triple Detector Gel Permeation Chromatography (3D-GPC) system, consisting of a Waters (Milford, Mass.) 150C high temperature chromatograph, equipped with an Infra-red detector (IR4 from Polymer Char, Valencia, Spain), was used. Concentration was measured with the Infra-red detector.

Data collection was performed using Viscotek TriSEC software Version 3 and a 4-channel Viscotek Data Manager DM400. The carrier solvent was 1,2,4-trichlorobenzene (TCB). The system was equipped with an on-line solvent degas device from Polymer Laboratories. The carousel compartment was operated at 150° C., and the column compartment was operated at 150° C. The columns were four Polymer Laboratories Mixed-A 30 cm, 20 micron columns. The samples were prepared at a concentration of "0.1 grams of polymer in 50 ml of TCB." The chromatographic solvent (TCB) and the sample preparation solvent contained "200 ppm of butylated hydroxytoluene (BHT)," and both solvent sources were nitrogen sparged. Polyethylene samples were stirred gently at 160° C. for 4 hours. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.38.

A first order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard. Number, weight, and z-average molecular weights were calculated according to the following equations:

$$\overline{Mn} = \frac{\sum_i Wf_i}{\sum_i (Wf_i / M_i)}, \quad (2)$$

$$\overline{Mw} = \frac{\sum_i (Wf_i * M_i)}{\sum_i Wf_i}, \quad (3)$$

$$\overline{Mz} = \frac{\sum_i (Wf_i * M_i^2)}{\sum_i (Wf_i * M_i)}, \quad (4)$$

where, $Wf_i$ is the weight fraction of the i-th component, and $M_i$ is the molecular weight of the i-th component. The MWD was expressed as the ratio of the weight average molecular weight (Mw) to the number average molecular weight (Mn).

The A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

Rheology DMS

Each sample was compression molded into a disk for rheology measurement. The disks were prepared by pressing the samples into "3.0 mm thick" plaques, and were subsequently cut into "25 mm diameter" disks. The compression molding procedure was as follows: 350° F. (177° C.) for five minutes, at 1500 psi (10.3 MPa), under N2 purge protection, then the chase was transferred into an ambient temperature oven, with N2 purge, until the sample plaque was solidified, and then the plaque was removed from the chase.

The resin rheology was measured on the ARES-LS model Rheometer from TA Instruments. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties, such as modulus and viscosity. The viscoelastic properties of the sample were measured, in the melt, using a "25 mm diameter" parallel plate set up, at 190° C., and as a function of varying frequency (range 0.01 s$^{-1}$ to 500 s$^{-1}$). A small constant strain (5%) was applied to ensure the measurement was in the linear viscoelastic region. The storage modulus (G'), loss modulus (G"), tan delta (G"/G'), and complex viscosity (eta*) of the resin were determined using Rheometrics Orchestrator software (v. 6.5.8).

Creep Measurement

Specimens for 24 hrs melt creep viscosity measurements were prepared by compression molding on a programmable Tetrahedron press. A rectangular chase was filled with the test material, and placed in the press for five minutes at 177° C. and 10$^7$ Pa. The chase was then removed, and placed on the countertop to cool down to room temperature. Disk shaped samples of "25 mm diameter and 1.8 mm thick" were die-cut from the compressed-molded plaque using a punch press and a handheld die.

Creep measurement: 24 hrs melt creep viscosity measurements were conducted on the stress controlled Rheometer AR-G2 by TA Instruments, using parallel plates of 25 mm diameter at the test temperature of 190° C. A compression molded disk sample was placed between the plates, and allowed to come to equilibrium for five minutes. The position of the upper plate was adjusted to set a gap of 1.550 mm. The excess of material was trimmed, and the test gap was set to 1.5 mm. The method had an additional five minute delay built in, to allow for temperature equilibrium. A constant shear stress of 20 Pa was then applied, and the test was run for 24 hours. Measurements were performed under nitrogen atmosphere, at a flow rate of 5 L/min.

The creep viscosity was determined from the ratio of the applied stress (20 Pa) to the steady shear rate. The steady shear rate was obtained from the strain ($\gamma$), by taking a linear regression of data collected during last 10% of the test time. The slope of the log-log plot of strain versus time was used as a criterion to verify that steady state was reached during the creep test. The magnitude of the slope of data collected during last 10% of the test time should be equal to, or greater than, 0.97; the target value is 1.

A small amplitude oscillatory shear test was conducted before and after the "24 hrs creep test," on the same specimen, from 0.1 to 100 rad/s, at 10% strain. The complex viscosity values of the two tests were compared as a criterion to verify the thermal stability of the sample, and hence the validity of the calculated creep viscosity. If the difference of the viscosity values at 0.1 rad/s is greater than 5%, the sample is considered to have degraded during the creep test, and the creep viscosity is discarded.

Melt Strength

Rheotens (Goettfert Inc., Rock Hill, S.C., USA) melt strength experiments were carried out at 190° C. The melt was produced by a Goettfert Rheotester 2000 capillary rheometer with a flat, 30/2 die, at a shear rate of 38.2 s$^{-1}$. The barrel of the rheometer (diameter: 12 mm) was filed in less than one minute. A delay of 10 minutes was allowed for proper melting. The take-up speed of the Rheotens wheels was varied, with a constant acceleration of 2.4 mm/sec$^2$. The tension in the drawn strand was monitored with time, until the strand broke. The steady-state force and the velocity at break were reported.

Pennsylvania Notch Test (PENT)

The Pennsylvania Notch Test (PENT), was performed following the procedure described by in ASTM F-1473, *Standard Test Method for Notch Tensile Test to Measure the Resistance to Slow Crack Growth of Polyethlyene Pipes and Resins*. The test was conducted in a temperature controlled air environment at 80° C., and using a stress of 2.4 MPa on compression molded plaques which were notched on three sides.

The compression molded plaques were made using ASTM D 4703, and included the additional preparation steps as required in F-1473. The compression molded plaques were cooled as detailed in the ASTM F-1473 procedure.

The specimens were notched on the top and on two sides at a speed of less than 0.25 mm/min, and "perpendicular to the tensile axis of the specimen" as required in F-1473. The notch depth was approximately 35% of the sample thickness. The razor used to make the notch was 0.2 mm thick.

One-Inch SDR 11 Pipe Extrusion

The "one inch pipe" SDR11 pipe specimens were produced on an American Maplan, four barrel zone extruder, equipped with a water cooled grooved feed section. The motor was manufactured by Lincoln Motors, Model No. CCS4P125T64YBT1, and had a 125 horse power (hp). The 1" SDR 11" specimens were made using a 1" SDR 11 tooling set. The extruder consisted of a "2½ inch diameter" 24:1 L/D screw, vacuum box, cooling tank, pipe puller, cutter and winder. The pipe was extruded to the specification ASTM D 3035, "Standard Specification for Polyethylene (PE) Plastic Pipe (DR-PR) Based on Controlled Outside Diameter," Table 2 (outside diameter) and Table 3 (wall thickness). The dimensions of the pipe specimens were measured per ASTM D-2122.

Two-Inch Diameter Pipe Extrusion—Output Test

The output of each resin was tested by extruding a "2-inch diameter" pipe on an American Maplan, four barrel zone extruder, equipped with a water cooled grooved feed section. The motor was manufactured by Lincoln Motors, Model No. CCS4P125T64YBT1, and had a 125 hp. The 2" specimens were made using tooling consisting of a 2" die and 2" SDR11 pin. The pipe was extruded using a 400° F. flat profile across the barrel temperatures, using a barrier screw. From the processing parameters, it is possible to calculate the work done by the motor to the polymer via energy dissipation through the screw. The energy dissipated to the polymer is known as the specific energy. The output was recorded at 90 and 135 rpm, respectively. This relationship is described in equations 1 and 2:

$$P = P_{max}\left(\frac{A}{A_{max}}\right)\left(\frac{RPM}{RPM_{max}}\right), \quad (1)$$

$$E = \frac{(5915 \cdot J \cdot lb)}{(hp \cdot g \cdot h)} \frac{P}{Q}, \quad (2)$$

where, P (hp) is the power that is dissipated,
$P_{max}$ is the name-plate power for the motor,
A is the motor current observed during the extrusion,
$A_{max}$ is the name-plate motor current at full load,
RPM is the screw speed during extrusion,
$RPM_{max}$ is the maximum screw speed the extruder is capable of running (without a field weakened motor),
E, (J/g) is the calculated specific energy, and
Q (lb/h) is the mass rate.

Sustained Pressure Testing

The "time to failure" by constant internal pressure of an extruded "one-inch SDR 11 black pipe" sample was determined per ASTM D-1598, on an IPT Airless System. This system consisted of water tanks, at 23° C., 60° C., 80° C. and 90° C., containing the pipe specimens, a pump to circulate the water, and a separate system, which maintains a constant water pressure at a set-point inside each pipe specimen at each station. Micro controllers automatically adjusted the individual pressures at each station. The system design automatically recorded the start time of the test, and then the end time when the pipe ruptured.

Hydrostatic Strength Regression Analysis

The "time to failure" data for each set of pipes was subject to a regression analysis per ASTM D-2837 (*Obtaining Hydrostatic Design Basis for Thermoplastic Pipe Materials or Pressure Design Basis for Thermoplastic Pipe Products*). This ASTM procedure details the regression method used to determine the Hydrostatic Design Basis (HDB) of a pipe. The method is based on "stress rupture data versus time," and is used to determine the resin's long-term hydrostatic strength (LTHS, measured per ASTM D 2837, at the required intercept of 100,000 hrs (11.4 yrs). This LTHS intercept is identified using a linear regression based on the "log-stress versus the log-time plot."

The term 'stress' refers to the hoop stress, which is calculated using the internal pressure in the pipe, the wall thickness, and outside pipe diameter. The following equation describes the relationship between these parameters, $$S=P(D-t)/(2*t),$$

where:
S=hoop stress,
P=internal pressure inside the pipe,
D=average outside diameter, and
t=minimum wall thickness.

EXPERIMENTAL

The following examples are to illustrate this invention and not to limit the invention. Ratios, parts, and percentages are by weight, unless otherwise stated.

Catalyst Preparation

Preparation of Catalyst Precursor

A titanium trichloride catalyst precursor was prepared in an approximately 7,500 liter, glass lined vessel, equipped with pressure and temperature control, and a turbine agitator. A nitrogen atmosphere (<5 ppm $H_2O$) was maintained at all times. Tetrahydrofuran (10,500 lb, 4,800 kg, <400 ppm $H_2O$) was added to the vessel. The tetrahydrofuran (THF) was recovered from a closed cycle dryer, and contained approximately 0.1 percent Mg and 0.3 percent Ti. An "11 percent THF solution" of triethylaluminum was added to scavenge residual water. The reactor contents were heated to 40° C., and 13.7 lb (6 kg) of granular magnesium metal (particle size 0.1-4 mm) was added, followed by 214.5 lb (97.3 kg) of titanium tetrachloride, added over a period of one-half hour.

The mixture was continuously agitated. The exotherm, resulting from the addition of titanium tetrachloride, caused the temperature of the mixture to rise to approximately 44° C. The temperature was then raised to 70° C., and held at that temperature for approximately four hours, then cooled to 50° C. At the end of this time, 522 pounds (238 kg) of magnesium dichloride were added, and heating was initiated to raise the temperature to 70° C. The mixture was held at this temperature for another five hours, then cooled to 35° C., and filtered through a 100 mesh (150 μm) filter to remove solids.

Fumed silica (CAB-O-SIL™ TS-610, manufactured by the Cabot Corporation) (811 lb, 368 kg) was added to the above precursor solution over a period of one hour. The mixture was stirred by means of a turbine agitator during this time, and for four hours thereafter, to thoroughly disperse the silica. The temperature of the mixture was held at 40° C. throughout this period, and a dry nitrogen atmosphere was maintained at all times. The resulting slurry was spray dried using an 8-foot diameter, closed cycle spray dryer equipped with a rotary atomizer. The rotary atomizer was adjusted to give catalyst particles with a D50 on the order of 20-30 μm. The scrubber section of the spray dryer was maintained at approximately +5 to −5° C.

Nitrogen gas was introduced into the spray dryer at an inlet temperature of 140 to 165° C., and was circulated at a rate of approximately 1000-1800 kg/hour. The catalyst slurry was fed to the spray dryer at a temperature of about 35° C. and a rate of 65-150 kg/hour, or sufficient to yield an outlet gas temperature in the range of 100-125° C. The atomization pressure was maintained at slightly above atmospheric. The resulting catalyst particles were mixed with mineral oil, under a nitrogen atmosphere, in a 400 liter, glass lined vessel, equipped with a turbine agitator, to form a slurry containing approximately 28 percent of the catalyst precursor.

Catalyst Precursor Partial Pre-Activation Example 1

The mineral oil slurry of precursor was partially activated by contact at room temperature with an appropriate amount of a 50 percent mineral oil solution of tri-n-hexyl aluminum (TNHA). The catalyst precursor slurry was added to a mixing vessel. While stirring, a 50 percent mineral oil solution of tri-n-hexyl aluminum (TNHA) was added at ratio of 0.17 moles of TNHA to mole of residual THF in the precursor, and stirred for at least one hour prior to use.

Catalyst Precursor Partial Pre-Activation Example 2

The mineral oil slurry of precursor was partially activated by contact at room temperature with an appropriate amount of a 40 percent mineral oil solution of tri-n-hexyl aluminum (TNHA). The catalyst precursor slurry was pre-contacted with the activator, and fed through a Kenics mixer to provide mixing prior to feeding to the reactor.

Polymerization

Ethylene was copolymerized with 1-hexene in two fluidized bed reactors. Each polymerization was continuously conducted, after equilibrium was reached, under the respective conditions, as shown below. Polymerization was initiated in the first reactor by continuously feeding the catalyst and cocatalyst (trialkyl aluminum, specifically tri ethyl aluminum or TEAL) into a fluidized bed of polyethylene granules, together with ethylene, 1-hexene and hydrogen. The resulting copolymer, mixed with active catalyst, was withdrawn from the first reactor, and transferred to the second reactor, using second reactor gas as a transfer medium. The second reactor also contained a fluidized bed of polyethylene granules. Ethylene and hydrogen were introduced into the second reactor, where the gases came into contact with the polymer and catalyst from the first reactor. Inert gases, nitrogen and isopentane, made up the remaining pressure, in both the first and second reactors. In the second reactor, the cocatalyst (TEAL) was again introduced. The final product blend was continuously removed. Table 1A lists polymerization conditions for the inventive polymer Example 1, and Table 1B lists the polymerization conditions for the inventive polymer Example 2.

TABLE 1A

Polymerization Conditions for Example 1

| REACTION CONDITIONS | First Reactor | Second (Final) Reactor |
| --- | --- | --- |
| Reactor Temperature ° C. | 75 | 110 |
| Reactor Pressure, psig | 348 | 392 |
| C2H4 Partial Pressure, psi | 24.06 | 94.60 |
| H2/C2 Molar Ratio | 0.022 | 1.79 |
| C6/C2 Molar Ratio | 0.076 | 0.005 |
| Isopentane, mole % | 2.88 | 0 |
| Catalyst Feed rate, cc/hr | 8.0 | |
| Co-catalyst | 2.5 wt % TEAL | 2.5 wt % TEAL |
| Co-catalyst Feed Rate, cc/hr | 180 | 150 |
| Production Rate, lb/hr | 33.0 | 41.5 |
| Bed Weight (lb) | 88.4 | 179.0 |
| Residence Time, hr | 2.53 | 2.41 |
| Split (wt %) | 47 | 53 |

TABLE 1B

Polymerization Conditions for Example 2

| REACTION CONDITIONS | First Reactor | Second (Final) Reactor |
| --- | --- | --- |
| Reactor Temperature ° C. | 71 | 110 |
| Reactor Pressure, psig | 257 | 429 |
| C2H4 Partial Pressure, psi | 37.1 | 107 |
| H2/C2 Molar Ratio | 0.017 | 1.76 |
| C6/C2 Molar Ratio | 0.060 | 0.003 |
| Isopentane, mole % | 9.03 | 4.17 |
| Catalyst Feed rate, lb/hr | 16.9 | |
| Co-catalyst | TEAL | TEAL |
| Co-catalyst feed Rate, lb/hr | 9.1 | 4.4 |
| Production Rate, lb/hr | 48200 | 46700 |
| Bed Weight (lb) | 97000 | 212000 |
| Residence Time, hr | 2.0 | 2.2 |
| Split (wt %) | 51 | 49 |

Polymer Properties

Polymer properties for inventive Example 1 are shown in Table 2A, and inventive Example 2 are shown in Table 2B.

TABLE 2A

Polymer Properties Inventive Example 1

| Measured Resin Properties | First Reactor (First Ethylene-based Polymer) | Second (Final) Reactor (First Composition) |
| --- | --- | --- |
| Melt Index, g/10 min I5 | | 0.39 |
| Flow Index, g/10 min I21 | 0.21 | 13.55 |
| MFR (I21/I5) | | 34.74 |
| Density, g/cm3 | 0.9218 | 0.9486 |
| I21 (first composition)/I21 (first ethylene-based polymer) | | 13.55/0.21 = 64.5 |

TABLE 2B

Polymer Properties Inventive Example 2

| Measured Resin Properties | First Reactor (First Ethylene-based Polymer) | Second (Final) Reactor (First Composition) |
| --- | --- | --- |
| Melt Index, g/10 min I5 | | 0.375 |
| Flow Index, g/10 min I21 | 0.22 | 14.33 |
| MFR (I21/I5) | | 38 |
| Density, g/cm3 | 0.9223 | 0.9488 |
| I21 (first composition)/I21 (first ethylene-based polymer) | | 14.33/0.22 = 65.1 |

Azide Coupling and Properties of Azide Coupled Resins

Resins were modified with an azide compound, DPO-BSA (diphenyloxide-4,4'-disulfonylazide), in the form of a Molecular Melt (MM). Inventive resins also contained additives, such as IRGANOX-1076 (Example 1 only), IRGANOX 1010, IRGAFOS 168, DYNAMAR 5911 and calcium stearate. "Molecular Melt" (MM) is the specific form of an azide composition received from Dynamit Nobel GmbH. This is not a physical mixture, but rather a granulated melt of DPO-BSA with IRGANOX-1010.

The Molecular Melt was added along with other additives to each resin, and the resin formulation was fed to a continuous mixer (Kobe Steel, Ltd. LCM-100 continuous mixer for Example 1 and LCM-450 for Example 2), which was closed coupled to a gear pump, and equipped with a melt filtration device and an underwater pelletizing system.

Each inventive resin (first composition) was subjected to post reactor azide coupling. The resin was treated with 60 ppm (μg/g) actual azide compound, based on the weight of the resin (first composition). As discussed above, the azide compound was delivered in the form of a Molecular Melt. The inventive and comparative compositions are given in Table 3. Comparative resins (compositions) B and C were also treated with azide in a similar manner.

TABLE 3

Inventive and Comparative Azide Coupled Resins

| Sample ID | Type | I21 (First ethylene based polymer) g/10 min | I21 (First composition)/ I21 (First ethylene-based polymer) | Azide* amount added to first composition ppm |
| --- | --- | --- | --- | --- |
| Example A | Comparative | 0.4 | 17.5 | 0 |
| Example B | Comparative | 0.4 | 19.0 | 72 |
| Example C | Comparative | 0.4 | 18.8 | 156 |
| Example D | Comparative | 0.21 | 64.5 | 0 |
| Example 1 | Inventive | 0.21 | 64.5 | 60 |
| Example 2 | Inventive | 0.22 | 65.1 | 60 |

*Amount of azide compound (DPO-BSA; ppm = μg/g) per weight of first composition.

Additional resin properties are shown in Table 4. The inventive compositions had an excellent balance of ease of processing, sag resistance, excellent pipe appearance and mechanical properties. The superior sag resistance of the inventive compositions is indicated by the viscosity values ($\eta^*$ at $0.02\ s^{-1}$, 190° C., >140,000 Pa·s) at low shear, as seen in Table 4.

TABLE 4

| | | Example A | Example B | Example C | Example D | Example 1 | Example 2 | Example E | Example F |
|---|---|---|---|---|---|---|---|---|---|
| Sample ID | | | | | | | | | |
| Type | | Comparative | Comparative | Comparative | Comparative | Inventive | Inventive | Comparative (LBI L4904) | Comparative (Ineos TUB 121) |
| Density final composition | g/cm$^3$ | 0.949 | 0.949 | 0.949 | 0.9486 | 0.9486 | 0.9491 | 0.9485 | 0.9592 |
| I5 final composition | g/10 min | 0.30 | 0.25 | 0.16 | 0.39 | 0.35 | 0.31 | 0.15 | 0.32 |
| I21 final composition | g/10 min | 7.0 | 6.7 | 5.5 | 13.55 | 13.16 | 13.58 | 6.63 | 9.36 |
| DSC | | | | | | | | | |
| Tc1 | °C. | 117.5 | 117.5 | 117.8 | 117.4 | 116.3 | 117.1 | 116.9 | 116.3 |
| Tm1 | °C. | 130.3 | 130.3 | 130.1 | 129.7 | 130.8 | 130.9 | 129.6 | 130.5 |
| GPC-Conventional | | | | | | | | | |
| Mn | g/mol | 10,120 | 9,960 | 8,800 | 7,300 | 9,020 | 8,987 | 9,525 | 6,888 |
| Mw | g/mol | 214,010 | 220,170 | 196,780 | 178,860 | 216,155 | 224,973 | 259,238 | 208,310 |
| Mw/Mn | | 21.1 | 22.1 | 22.4 | 24.5 | 24.0 | 25.0 | 27.2 | 30.2 |
| Mz | g/mol | 905,500 | 972,800 | 803,600 | 902,700 | 1,188,297 | 1,195,107 | 1,341,299 | 1,060,858 |
| Rheology | | | | | | | | | |
| η* at 0.02 s$^{-1}$, 190° C. | Pa·s | 119,000 | 188,000 | 201,483 | 140,540 | 193,000 | 224,000 | 305,000 | 169,000 |
| η* at 0.02 s$^{-1}$/η* at 100 s$^{-1}$, 190° C. | | 49 | 80 | 77 | 71 | 70 | 80 | 85 | 54 |
| tan δ at 0.02 s$^{-1}$, 190° C. | | 2.84 | 1.60 | 1.52 | 2.32 | 1.62 | 1.52 | 1.73 | 2.21 |
| tan δ at 0.02 s$^{-1}$/tan δ at 100 s$^{-1}$, 190° C. | | 5.7 | 3.3 | 3.3 | 5.0 | 3.6 | 3.5 | 4.1 | 4.6 |
| PENT | | | | | | | | | |
| Failure time @ 80° C., 2.4 MPa | h | >10,000 | >5,000 | >10,000 | >10,000 | >10,000 | >10,000 | >8,500 | >8,500 |
| Pipe Appearance | | | | | | | | | |
| Pipe inner surface, visual inspection | | — | Matt surface | Rough, wavy surface | — | Smooth, shiny surface | Smooth, shiny surface | — | — |

Pipe Extrusion—Specific Energy and Other Properties

Pipes were fabricated on a pipe extrusion line—see test method section (Output Test). The specific energy was calculated using the equations described in the test method section. The extrusion conditions and output results are shown in Table 5.

As seen in FIG. 1 (Specific Energy vs. Output Rate), the inventive resin (Example 2) required a lower amount of specific energy relative to the comparative resins, Examples A and B. For Examples E and F, it was not possible to achieve an output at 135 rpm, because the motor load reached the maximum recommended, safe operating limit. Thus, a larger motor is required to run the comparative samples at the higher rpm.

Example 2

Inventive

Specific Energy(J/g)=831.3+0.29*Rate, where $r2=0.99$

Example A (Comparative)

Specific Energy(J/g)=860.1+0.38*Rate, where $r2=1$ (3)

Example B (Comparative)

Specific Energy(J/g)=845.0+0.30*Rate, where $r2=1$ (4)

Example E (Comparative)

LYONDELLBASELL L4904

Not possible to calculate the specific energy, since the motor load reached the maximum safe operating limit prior to achieving the required 135 rpm.

Example F (comparative)

INEOS TUB 121

Not possible to calculate the specific energy, since the motor load reached the maximum safe operating limit prior to achieving the required 135 rpm.

TABLE 6

Example 1, 23° C. LTHS Extrapolation Summary

| | |
|---|---|
| E10 Regression status | completed |
| 100,000 h LTHS, psi | 1581 |
| Validation at 80° C., 825 psi | >200 hrs |
| LCL/LTHS ratio | 0.971 |
| PE 4710 Requirement | |
| LTHS | 1530 to <1920 psi |
| Validation at 80° C., 825 psi | >200 hrs |
| LCL/LTHS ratio | > or =0.85 |

TABLE 5

Extrusion Conditions†

| Resin | Example 2 | | | | Example A | | Example B | | Example E L4904 LYONDELLBASELL | | Example F TUB121 INEOS | |
|---|---|---|---|---|---|---|---|---|---|---|---|---|
| Carbon Black Masterbatch | 6.5 wt % | | | | 6.5 wt % | | 6.5 wt % | | 6.5 wt % | | precompounded grade | |
| Temp Profile | 400 F. Flat | | | | 400 F. Flat | | 400 F. Flat | | 400 F. Flat | | 400 F. Flat | |
| Screw RPM | 90 | 135 | 131 | 140 | 90 | 132 | 90 | 135 | 90 | 131‡ | 90 | 102‡ |
| Rate, Q [lb/hr] | 390 | 571 | 557 | 593 | 371 | 536 | 366 | 534 | 392 | 561 | 399 | 448 |
| Melt [° F.] | 390 | 395 | 394 | 394 | 397 | 401 | 402 | 412 | 392 | 394 | 394 | 396 |
| Barrel press [psi] | 3737 | 4296 | 4296 | 4471 | 3528 | 4296 | 1991 | 2305 | 4017 | 4436 | 3423 | 3737 |
| Motor Load [%] | 90 | 92 | 92 | 93 | 90 | 94 | 85 | 87 | 90 | 95 | 94 | 95 |
| Actual amps | 136 | 140 | 140 | 141 | 136 | 143 | 129 | 132 | 136 | 144 | 141 | 143 |
| Calc Specific Rate [lb/hr/rpm] | 4.3 | 4.2 | 4.3 | 4.2 | 4.1 | 4.1 | 4.1 | 4.0 | 4.4 | 4.3 | 4.4 | 4.4 |
| Power (kW) = Pmax(A/A max) * (rpm/rpm max) | 62 | 96 | 93 | 101 | 63 | 96 | 59 | 91 | 62 | 96 | 65 | 75 |
| Is Motor at Recommended Max hp? | No | No | No | No | No | Yes | No | No | No | Yes | Yes | Yes |
| Specific Energy (J/g) = 5915 * P/Q | 946 | 997 | 992 | 1,008 | 1,000 | 1,062 | 954 | 1,004 | 943 | 1,014 | 964 | 987 |

†Pipe was also formed from Example 1 using extrusion conditions listed for Example 2.
‡Resins could not be extruded at 135 rpm.

Pipe appearance: Smoothness—Pipe formed from Examples 1 and 2 (inventive) each had a smoother surface appearance compared to the surface of the pipe formed from Examples B and C (comparative).

Aesthetics: Pipe formed from Example B had a matted appearance, whereas pipe formed from Examples 1 and 2 each had a shiny appearance. Pipe formed from Example C had the roughest surface.

Pipe Mechanical Properties

PENT values are shown in Table 4. PENT is a measure of resistance to slow crack growth. As seen in Table 4, the inventive compositions has excellent PENT values.

Hydrostatic Performance

The Hydrostatic Performance requirements are as follows: 1600 psi HDB at 23° C. and 1000 psi HDB at 60° C. See Tables 6 and 7 below. As seen in these tables, pipe formed from the inventive composition (Example 1) had excellent hydrostatic performance at 23° C. and 60° C.

TABLE 7

Example 1, 60° C. LTHS Extrapolation Summary

| | |
|---|---|
| E10 Regression status | completed |
| 100,000 h LTHS, psi | 1010 |
| Validation at 90° C., 690 psi | >3,800 hrs |
| LCL/LTHS ratio | 0.923 |
| PE 4710 Requirement | |
| LTHS | 960 to <1200 psi |
| Validation at 90° C., 690 psi | >3,800 hrs |
| LCL/LTHS ratio | > or =0.85 |

The invention claimed is:
1. A pipe formed from a composition, the composition comprising:
A) a first composition, wherein the first composition comprises a first ethylene-based polymer and a second ethylene-based polymer, wherein the first composition comprises from 38 to 60 wt. %, based on the sum weight of the first ethylene-based polymer and the second ethylene-based polymer, of the first ethylene-based polymer and from 40 to 62 wt. %, based on the sum weight of the first ethylene-based polymer and the second ethylene-based polymer, of the second ethylene-based polymer, and wherein the ratio of the "high load melt index (I21) of the first composition" to the "high load melt index (I21) of the first ethylene-based polymer" is from 40 to 90, wherein the first ethylene-based polymer has a density greater than, or equal to, 0.915 g/cm$^3$ and a density less than or equal to 0.930 g/cm$^3$, and wherein the first composition has a density greater than 0.940 g/cm$^3$ and a density less than or equal to 0.955 g/cm$^3$, a high load melt index (I21) of from 10 to 22 g/10 min, and a melt flow ratio (I21/I5) from 25 to 45; and B) one or more azide compounds present in an amount of from 50 to 90 ppm, based on the weight of the first composition.

2. The pipe of claim 1, wherein the first ethylene-based polymer has a high load melt index (I21) less than, or equal to, 0.30 g/10 min.

3. The pipe of claim 1, wherein the weight average molecular weight Mw (of the first ethylene-based polymer) is greater than the weight average molecular weight Mw (of the second ethylene-based polymer).

4. The pipe of claim 1, wherein the weight ratio of the first ethylene-based polymer to the second ethylene-based polymer is less than, or equal to, 1.5.

5. The pipe of claim 1, wherein the composition comprises greater than, or equal to, 80 weight percent of the first composition, based on the weight of the composition.

6. The pipe of claim 1, wherein the first ethylene-based polymer is an ethylene/α-olefin interpolymer.

7. The pipe of claim 6, wherein the α-olefin is selected from the group consisting of propylene, 1-butene, 1-hexene, and 1-octene.

8. The pipe of claim 1, wherein the ratio of the "high load melt index (I21) of the first composition" to the "high load melt index (I21) of the first ethylene-based polymer" is from 50 to 90.

9. The pipe of claim 1, wherein the ratio of the "high load melt index (I21) of the first composition" to the "high load melt index (I21) of the first ethylene-based polymer" is from 60 to 90.

10. The pipe of claim 1, wherein the composition has a Pennsylvania Notch Test (PENT) value, as measured according to ASTM F-1473 at 80° C. and 2.4 MPa, of greater than 10,000 hours.

11. A pipe formed from a composition, the composition comprising:
A) a first composition, wherein the first composition comprises a first ethylene-based polymer and a second ethylene-based polymer, wherein the first composition comprises from 38 to 60 wt. %, based on the sum weight of the first ethylene-based polymer and the second ethylene-based polymer, of the first ethylene-based polymer and from 40 to 62 wt. %, based on the sum weight of the first ethylene-based polymer and the second ethylene-based polymer, of the second ethylene-based polymer, and wherein the ratio of the "high load melt index (I21) of the first composition" to the "high load melt index (I21) of the first ethylene-based polymer" is from 40 to 90, wherein the first ethylene-based polymer has a density greater than, or equal to, 0.915 g/cm$^3$ and a density less than or equal to 0.930 g/cm$^3$, and wherein the first composition has a density greater than 0.940 g/cm$^3$ and a density less than or equal to 0.955 g/cm$^3$, a high load melt index (I21) of from 10 to 22 g/10 min, and a melt flow ratio (I21/I5) from 25 to 45; and
B) one or more azide compounds present in an amount of from 50 to 90 ppm, based on the weight of the first composition;
wherein the composition has a hydrostatic design basis (HDB) validation for long term hydrostatic strength at 90° C. and 690 psi, as measured according to ASTM D2837, of greater than 3800 hours.

* * * * *